US010620606B2

(12) United States Patent
Sotgiu

(10) Patent No.: US 10,620,606 B2
(45) Date of Patent: Apr. 14, 2020

(54) METHOD AND EQUIPMENT FOR FITTING TYRES ONTO RIMS AND REMOVING THEM THEREFROM

(71) Applicant: SNAP-ON EQUIPMENT S.R.L., Correggio (Reggio Emilia) (IT)

(72) Inventor: Paolo Sotgiu, Modena (IT)

(73) Assignee: SNAP-ON EQUIPMENT S.R.L., Correggio (Reggio Emilia) (IT)

( * ) Notice: Subject to any disclaimer, the term of this patent is extended or adjusted under 35 U.S.C. 154(b) by 31 days.

(21) Appl. No.: 16/007,256

(22) Filed: Jun. 13, 2018

(65) Prior Publication Data

US 2018/0356784 A1 Dec. 13, 2018

(30) Foreign Application Priority Data

Jun. 13, 2017 (IT) .................. 102017000065506

(51) Int. Cl.
  *G05B 19/048* (2006.01)
  *B60C 25/00* (2006.01)
  (Continued)

(52) U.S. Cl.
  CPC ............ *G05B 19/048* (2013.01); *B60C 25/00* (2013.01); *B60C 25/056* (2013.01);
  (Continued)

(58) Field of Classification Search
  None
  See application file for complete search history.

(56) References Cited

U.S. PATENT DOCUMENTS 5,196,772 A * 3/1993 Kupka .................. B60C 25/04
  157/1.1
8,613,303 B1 12/2013 Hanneken et al.
  (Continued)

FOREIGN PATENT DOCUMENTS

DE   4205045 C1   8/1993
EP   1247661 A2   10/2002
  (Continued)

OTHER PUBLICATIONS

Search Report issued in Italian Patent Application No. 102017000065506 dated Feb. 7, 2018.
  (Continued)

*Primary Examiner* — Ramesh B Patel
(74) *Attorney, Agent, or Firm* — McDermott Will & Emery LLP

(57) ABSTRACT

A method is presented for fitting a tyre onto a rim or removing a tyre from a rim in a tyre fitting machine using an appropriate tool. A wheel, a tyre/rim assembly, or the rim alone is caused to rotate about an axis of rotation, and at least one operating parameter of the tyre fitting machine is continuously monitored during the rotation to determine every actual value. Change in or gradient of such actual value is automatically monitored over time and each actual value found and/or the change in the value over time is compared with corresponding predetermined threshold values. The predetermined threshold values define a range of present values and/or change in values delimiting an accepted operating range for the tyre fitting machine, and the machine is controlled to maintain each measured present value and/or change therein over time within the range of corresponding predetermined threshold values.

21 Claims, 4 Drawing Sheets

(51) Int. Cl.
*B60C 25/05* (2006.01)
*B60C 25/138* (2006.01)

(52) U.S. Cl.
CPC ........ *B60C 25/0548* (2013.01); *B60C 25/138* (2013.01); *G05B 2219/24015* (2013.01); *G05B 2219/2637* (2013.01)

(56) References Cited

U.S. PATENT DOCUMENTS

| | | | | |
|---|---|---|---|---|
| 8,770,254 | B1* | 7/2014 | Hanneken | B60C 25/138 157/1.17 |
| 9,375,984 | B2* | 6/2016 | Bonacini | B60C 25/138 |
| 9,415,644 | B2* | 8/2016 | Sotgiu | B60C 25/056 |
| 9,662,945 | B2* | 5/2017 | Molbach | B60C 25/0515 |
| 9,834,046 | B2* | 12/2017 | Nicolini | B60C 25/056 |
| 9,944,136 | B2* | 4/2018 | Bonacini | B60C 25/0551 |
| 10,000,101 | B2* | 6/2018 | Corghi | B60C 25/056 |
| 2008/0179014 | A1* | 7/2008 | Sotgiu | B60C 25/138 157/1.3 |
| 2008/0297777 | A1* | 12/2008 | Sotgiu | B60C 25/0554 356/139.09 |
| 2009/0033949 | A1* | 2/2009 | Braghiroli | B60C 25/0554 356/635 |
| 2011/0174446 | A1* | 7/2011 | Braghiroli | B60C 25/0554 157/1.24 |
| 2012/0205054 | A1* | 8/2012 | Kirstatter | B60C 25/138 157/1.17 |
| 2016/0263953 | A1* | 9/2016 | Dressler | B60C 25/13 |
| 2018/0372575 | A1* | 12/2018 | Sotgiu | G01M 1/045 |

FOREIGN PATENT DOCUMENTS

| | | |
|---|---|---|
| EP | 2353889 A1 | 8/2011 |
| EP | 3000627 A1 | 3/2016 |
| EP | 3147141 A1 | 3/2017 |
| GB | 2466879 A | 7/2010 |
| IT | 1263940 B | 9/1996 |
| IT | RE970077 A1 | 4/1999 |

OTHER PUBLICATIONS

European Search Report issued in corresponding European Patent Application No. 18 176 865, dated Nov. 8, 2018.

* cited by examiner

METHOD AND EQUIPMENT FOR FITTING TYRES ONTO RIMS AND REMOVING THEM THEREFROM

This application claims the benefit of priority to Italian Patent Application No. 102017000065506, filed Jun. 13, 2017, which is incorporated by reference in its entirety.

The present invention relates to a method for fitting a tyre onto a rim or for removing a tyre from a rim according to the precharacterising clause of the principal claim.

Another object of the invention is equipment for fitting a tyre onto a rim or removing a tyre from a rim according to the precharacterising clause of the corresponding independent claim.

Equipment for fitting tyres onto rims or for removing tyres from rims comprising an electric motor driving a shaft of a rotating support on which the rim is located are already known in the state of the art. In this description such equipment will by way of example be referred to as "tyre fitting machines".

For example IT-RE97-A-77 describes a tyre fitting machine which uses an electric motor that can be supplied with different feed voltages. This machine is equipped with an electric motor of the single-phase series-wound type, having a characteristic graph for the variable torque according to the motor's rotation speed.

The electrical current taken up from the grid by said motor is proportional to the resistance torque applied to its output shaft, which in turn depends on the effort made by a tool (acting together with the tyre during the stages of fitting onto or removal from a rim), driven by said motor, when said tool operates between the edge of the rim and the edge of the tyre.

In order to prevent the risk of damaging the usual rotor brushes of the electric motor the machine described in IT-RE97-A-77 is provided with means to limit its current consumption, maintaining it below a threshold value which has been predetermined by the maker of the electric motor.

A further device for fitting a tyre onto a rim is illustrated in IT-MI93-A-304 which discloses a device provided with a rotating plate capable of supporting a rim/tyre unit or a rim, and driven by the output shaft of an electric motor, this electric motor being capable of being switched on by a pedal.

According to this prior art, depending upon the amount of movement of the pedal with respect to a reference position, an operator can change the strength of the current supplied to the electric motor and therefore gauge the torque generated by the motor used for rotational movement of the rotating plate. This gauging may also be effected by storing several graphs of the force applied between the edge of the rim and that of the tyre in a suitable memory of a control circuit for the motor, graphs which refer to the type of tyre. Control of the current strength to obtain a gauged torque corresponding to a particular type of tyre is then effected in a manner dependent upon the memorised graph.

The advantage of this known equipment is that it protects tyres from possible damage, in that the operator is capable of changing the motor torque and adjusting it to various requirements depending upon the type of tyre, for example providing a higher motor torque for high stiffness tyres.

U.S. Pat. No. 5,196,772 discloses equipment for fitting a vehicle tyre to a corresponding rim. Said equipment is provided with a tool for inserting tyres onto the edge of rims rotatably mounted with respect to an axis, and an electric motor for moving the tool for such insertion about said axis. The equipment comprises means for supplying current to drive the motor and torque limiters to stop rotation of the motor when a predetermined torque value transmitted to the tool for fitting the tyres exceeds a predetermined safe value. This makes it possible to preserve the tyre from damage due to possible overloads transmitted to the tyre during fitting operations.

Another item of equipment for fitting tyres to rims is disclosed in EP-A2-1247661. The equipment, of a type similar to that described in U.S. Pat. No. 5,196,772, also comprises a torque gradient limiting device, which gives rise to a braking current to stop rotational movement of the motor when a predetermined value of the torque gradient transmitted by the motor to the tool for inserting the tyre is overcome.

Finally, further equipment for fitting a tyre onto a rim or removing a tyre from a rim is disclosed in EP-A1-2353889. Said equipment comprises an electric motor for rotating a wheel (or a rim/tyre unit) with respect to an axis supporting it, a control device to provide a feed current to the electric motor and a detection device to detect the current consumed by the motor and transmit corresponding signals to a control device controlling the feed current to the motor on the basis of the required torque rotation speed for the fitting and/or removal operation; this control device is capable of changing the characteristic of the current fed to the motor by applying a high peak torque (or "boost function") when the measured current of the motor is greater than a limiting value predetermined at a low rotation speed for a predetermined period of time. This known solution therefore alters the current (in particular by combining its frequency and/or amplitude) only to generate a high torque when a particular force of the motor is felt through exceeding the predetermined current limit. Such change or increase in the frequency and/or amplitude of the motor current takes place within a maximum predetermined limit for application of the peak torque.

EP3000627 in the name of the same Applicant relates to a device and a method for fitting or removing a tyre onto or from a rim, where a wheel or the rim/tyre unit or only the rim rotates about an axis driven by an electric motor, preferably of the asynchronous type. The feed current to the motor is controlled by varying the feed frequency and/or amplitude and/or voltage.

The current is continuously monitored and varied to provide an optimum torque/motor speed combination on the basis of the fitting/removal operating conditions so that the motor can always operate under conditions where the motor's rotation speed is maximised in relation to the required torque throughout the period when it is in operation.

EP3147141 in the name of the same Applicant relates to a method and device similar to that in EP3000627 mentioned above, but where the rotation speed of the electric motor is continuously monitored to allow variation of the feed current to obtain the optimum torque/motor speed combination and make it possible for the motor to function under conditions in which its rotation speed is maximised with the required torque.

The prior art therefore provides for interruption of the procedure for fitting a tyre in order to safeguard it.

U.S. Pat. No. 8,770,254 relates to a tyre fitting machine capable of facilitating efficient tyre changing, with reduced difficulty for the operator and with improved control characteristics. Provision is made for systems capable of preventing damage to the rim of the wheel, to the machine itself, or to components associated with the wheel such as a sensor for monitoring the pressure of the tyre (TPMS) or other components of the wheel, and/or potentially hazardous operating conditions which might be brought about during changing a tyre.

The United States text in particular describes the control of tools performing a tyre change such as the wedge which is placed between the tyre and the rim, the tool which removes the bead of the tyre from the rim and the tool which exerts a pressure on the side of the tyre during the procedure of fitting onto or removal from the rim.

The above-mentioned control is capable of adjusting the functioning of the machine in response to the detection of forces exerted by such tools on the wheel to prevent damage to its components (tyre and rim).

With this object, in the United States text provision is made for the above-mentioned tools to be operatively connected to actuators which move them in various possible operating positions, these actuators being coordinated in their functioning by a control unit. This control unit can accept inputs from known position encoders and machine viewing techniques which provide an aid to suitable positioning of said tools with respect to the tyre and rim.

In some solutions, the known solution also comprises elements which detect the force exerted by the tools during use of the machine and the position of such tools during such use. Data relating to such force and position are detected through monitoring an electrical parameter, such as voltage or current, associated with a driver for each tool; an increase or decrease in the voltage or current is an indication that the force exerted by the tool is increasing or decreasing.

On the basis of the correlation between voltage and current and force it is possible to determine not only that the force is increasing or decreasing, but also its value; measurement of an electrical parameter is therefore used in the United States text to provide the tyre fitting machine with tactile feedback relating to how much force is applied by the tool so that any error conditions can be detected, optimising the functioning of the machine and knowing whether the tool is in use.

U.S. Pat. No. 8,770,254 does not describe any monitoring of the aforesaid electrical parameter for the purposes of maintaining said parameter within any preset range of threshold values, but only teaches determination of the force generated by the tools of the tyre fitting machine through monitoring an electrical parameter of a driver to which each tool is connected. In this patent there is no monitoring of the change and/or gradient in such monitored electrical parameter over time in order to know whether the operating range in which the machine lies is changing (fitting or removal) or is likely to cause damage to the tyre or the rim.

The United States patent makes it possible to determine whether the force generated by the monitored tools is at least at a value such as to be able to damage the tyre or the rim, without allowing any action on such tool before such value is reached through examination and evaluation of the change and/or gradient in the monitored parameter over time.

The object of the present invention is to provide a method and equipment for fitting and/or removing a tyre onto/from a rim, thanks to which it is possible to obtain a further improvement in the fitting and/or removal process in comparison with known solutions, to prevent damage to the tyre and/or the rim.

In particular, the object of the invention is to provide a method and equipment for fitting and/or removing a tyre onto/from a rim which makes it possible to operate such fitting and/or removal of the tyre in an optimum way, automatically and without the intervention of an operator, in accordance with the operating conditions applying during such fitting and/or removal.

Another object is that of providing a method of the above-mentioned type for fitting or removing a tyre which makes the use of a tyre fitting machine easier, even for operators with limited experience.

Another object is to provide a method and equipment of the above-mentioned type which makes it possible to speed up the operation of fitting and removing a tyre onto or from rims having particular dimensional characteristics (i.e. of large size) and fitting and removing tyres having particular characteristics such as tyres of the "run-flat" or lower profile type.

Another object is that of providing a method according to the invention which makes it possible to safeguard the tyre when it is being processed, stopping the fitting or removal operation when operating conditions of the tyre fitting machine which might damage the tyre and/or the rim are detected.

Another object of the present invention is to provide a method and equipment for fitting and/or removing a tyre onto/from a rim which do not require previous knowledge of the type of tyre and/or rim, in particular the rigidity characteristics of the tyre.

A further object of the present invention is to provide a method and equipment for fitting and/or removing a tyre onto/from a rim which nevertheless increase safeguarding of the mechanical and electrical components of the equipment itself, thus improving its reliability and extending its service life.

Another object of the present invention is to provide a method and equipment for fitting and/or removing a tyre onto/from a rim which substantially reduce times for the fitting and/or removal process, thus increasing the operator's productivity.

A further object of the present invention is to provide a method and equipment for fitting and/or removing a tyre onto/from a rim which improve the overall efficiency of the fitting and/or removal process in comparison with known solutions, for example in terms of safety, energy consumption, noise or other factors.

Finally, a further object of the present invention is to provide equipment for fitting and/or removing a tyre onto/from a rim, which is at the same time economical, productive, robust and reliable.

These and other objects of the present invention which will be apparent to a person skilled in the art are achieved through a method and equipment according to the appended claims.

The invention will be described in greater detail below through embodiments provided purely by way of non-limiting example, with reference to the appended drawings, in which.

Figure 1:
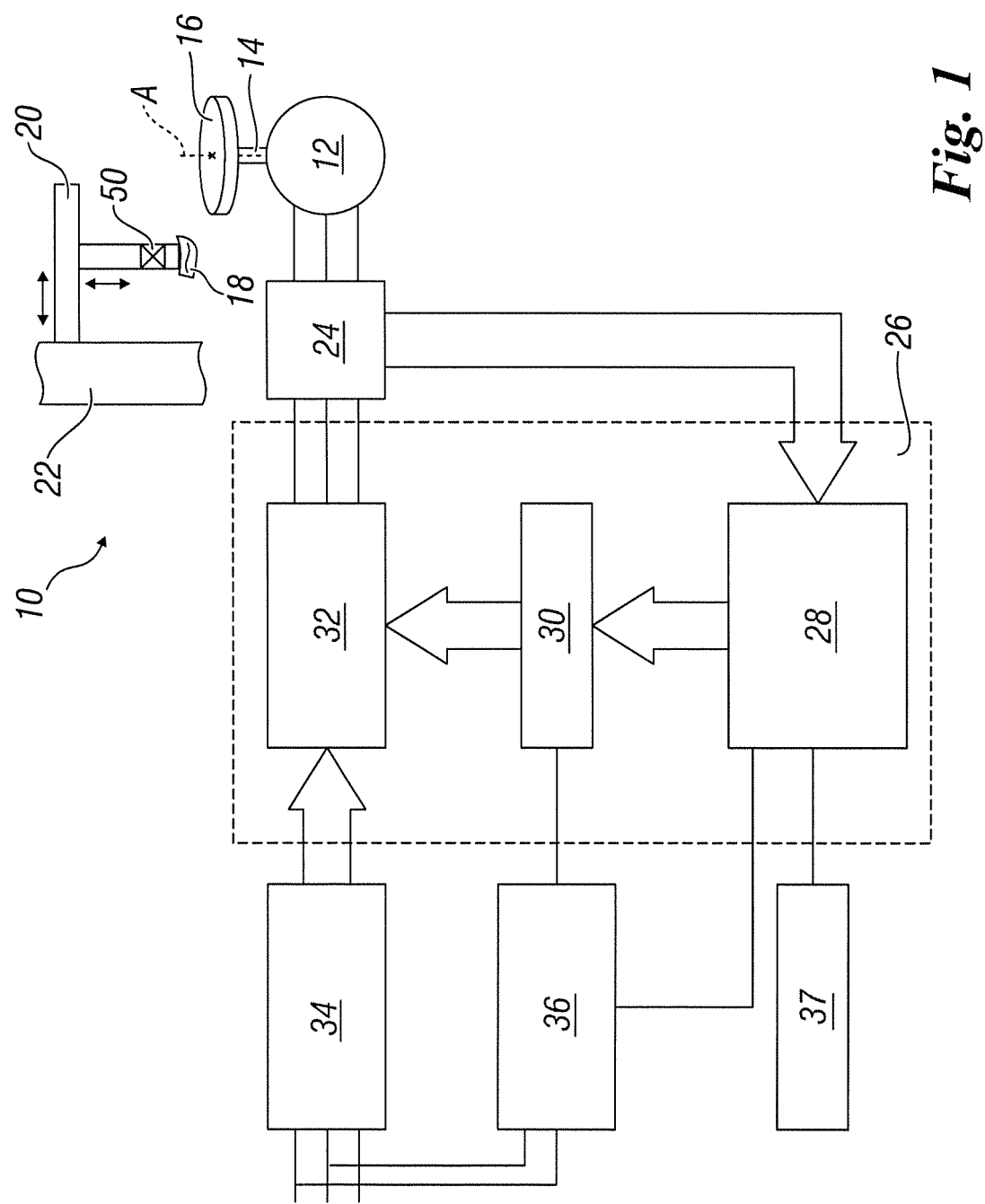
FIG. 1 shows diagrammatically a tyre fitting machine in which a method according to the invention can be implemented.
Figure 2:
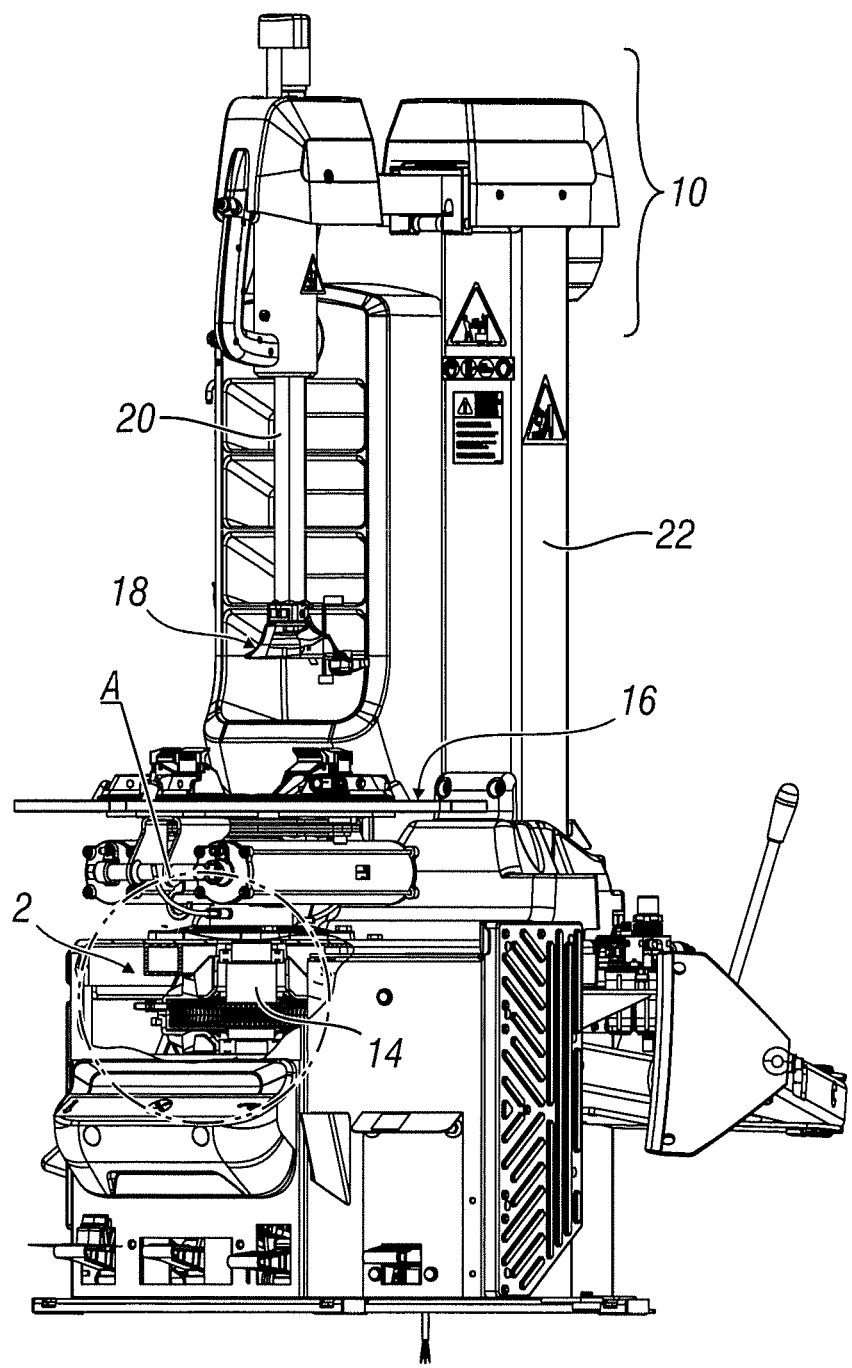
FIG. 2 shows a side view of an actual item of equipment according to FIG. 1.
Figure 3:
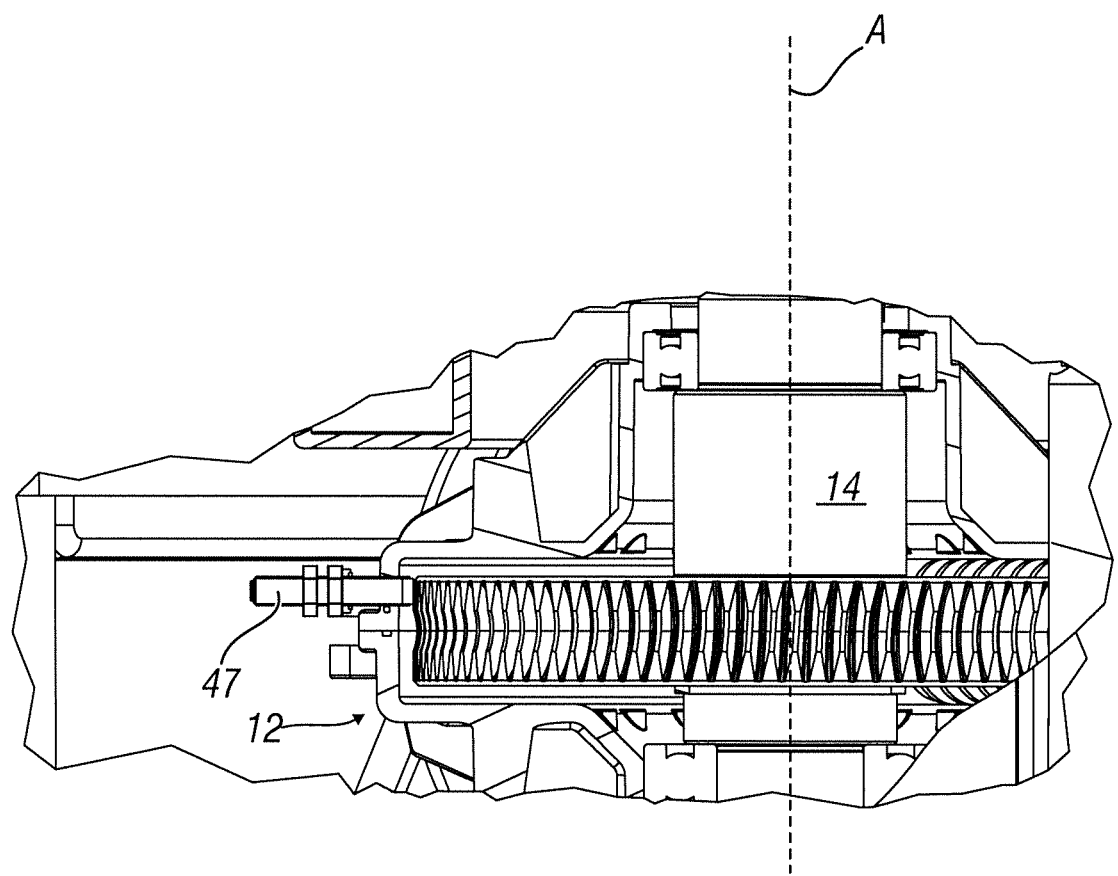
FIG. 3 shows the part indicated by A in FIG. 2 on a magnified scale.

FIG. 1 diagrammatically shows equipment 10 for fitting/removing tyres onto/off corresponding rims (equipment which for brevity is indicated, as already previously anticipated, as a tyre fitting machine, or merely fitting machine) according to the present invention. A practical embodiment of this equipment 10 is also illustrated in FIGS. 2 and 3.

Tyre fitting machine 10 comprises an electric motor 12 to drive a motor shaft 14 connected to a rotating support 16 of a known type, to which is attached and subsequently caused to rotate a wheel (that is a rim/tyre unit) or only the rim, for the operations of fitting/removing a tyre. This motor 12 and the shaft are part of means driving such rotating support 16, drive means which also comprise the usual elements (not shown) for transmitting motion from the motor to the shaft and/or from the shaft to said rotating support 16.

The electric motor is preferably a three-phase motor, Single-phase or two-phase motors may also be used as an alternative to a three-phase electric motor. In particular, asynchronous motors, that is induction motors, may be used. Even more preferably a four-pole induction motor is used.

Tyres which are centred with respect to the axis of rotation A of rotating support 16 can be positioned on rotating support 16. Close to such support, provision is made for a normal tool 18 capable of acting together with and to move the normal bead of a tyre. This tool 18 is mounted on a supporting arm 20 which is in turn connected to a housing which is supported, for example, by an upright 22.

Tool 18 for moving the bead of the tyre is of a type which is in itself known and may, for example, be a fitting/removal tool, preferably shaped as a hook, nail or lever. In general said fitting/removal tool 18 may be of the fixed or moving type and/or be articulated with respect to supporting arm 20. As an alternative, tool 18 for moving the bead of the tyre may be a bead removal tool, for example of the rotating disc type. Alternatively tool 18 for moving the bead may be any tool of an auxiliary type, for example of the disc, roller, wedge type, etc., capable of acting together with the bead of the tyre during the above-mentioned fitting/removal operation.

The feed to the motor, especially the frequency and/or amplitude of the feed current and/or the feed voltage to motor 12, is variable, that is it is reflected in a different speed of motor shaft 14. The feed current and/or voltage data and the speed data define the operating parameters of the motor.

In order to detect the current taken up by electric motor 12, a device 24 for detecting such consumption is connected to said electric motor 12. Because the current actually taken up by the motor can be easily correlated with the resistance torque applied to the electric motor, the latter can be correctly determined and monitored. Torque data thus also fall within the operating parameters of electric motor 12.

Device 24 is for example a Hall effect sensor, or a current measuring resistor, or again a current transformer or the like.

Detection device 24 is connected to a monitoring device 26 capable of monitoring the motor feed current in relation to the rotation speed and torque required for the fitting and/or removal operation. This device 26 therefore monitors said fitting and/or removal operation on the basis of the operating parameter or parameters of motor 12 found and/or calculated by device 26 and/or by device 24.

The detection signals generated by detection device 24 are therefore in fact transmitted to monitoring device 26, which performs said monitoring on the basis of such signals.

In particular, monitoring device 26 is capable of changing the feed frequency and/or amplitude and/or voltage and therefore of the feed current to electric motor 12. This change in the motor current is useful in that the speed and torque requirements during fitting and/or removal operations differ depending upon the type of tyre fitted and/or removed.

It is in fact known that the side walls of tyres are of different rigidity. In order to fit/remove high rigidity tyres, for example of the so-called run-flat type, from their respective rims, low speed at high torque is required, whereas high speed and low torque are required for basic operations.

Detection device 24 is capable of independently and automatically detecting when the rotation shaft 14 is slowed because of a strong request for torque, a condition which generally causes motor 12 to work far from an optimum torque/speed combination (or graph). When this happens, on the basis of the detection by device 24 and the signals generated by the latter, monitoring device 26 is capable of automatically changing the motor feed current, for example, by varying the feed frequency and/or amplitude and/or voltage, and thus quickly returning the motor to optimum torque/speed conditions, depending upon the new operating conditions for fitting/removal. This automatic calibration of the functioning conditions of the motor preferably takes place continuously and smoothly and may take place whenever it is necessary to increase the torque and decrease the speed, or conversely when it is necessary to increase the speed and reduce the torque.

In addition to this, through detection of the motor operating parameters by device 24 on the basis of the signals generated by such device 24, monitoring device 26 is capable of detecting whether the operation being performed by tyre fitting machine 10 is an operation of fitting a tyre onto a rim or an operation of removing such a tyre. This takes place wholly automatically.

Furthermore, device 26 is capable of automatically guiding the functioning of the drive means by monitoring the transmission ratio of the transmission components associated with motor 12 and/or shaft 14 and/or support 16.

Monitoring device 26 comprises a monitoring unit preferably with a microprocessor 28, and interface circuit 30 and a control device 32 capable of controlling motor 12 by acting on its electrical feed.

Detection device 24 is connected to the unit or, more simply and more usually, microprocessor 28, to which the signals or data generated by detection device 24 indicating the uptake of current by electric motor 12 arrive. Depending upon these signals or data, microprocessor 28 is capable of controlling and monitoring control device 32 comprising, for example, feed switches, for example electronic switches or inverters, in turn capable of monitoring and regulating the motor feed current.

Interface circuit 30, located between microprocessor 28 and control device 32, serves to convert and transmit the commands of microprocessor 28 to control device 32. In particular, interface circuit 30 performs the functions of voltage conversion and interfacing, in addition to providing protection for the maximum level of current taken up by the motor in order to prevent any damage to it.

Possibly a time counter associated with microprocessor 28 may also be present and, for example, incorporated in interface circuit 30. If the electrical current taken up by the motor and measured by detection device 24 continues to be beyond a specific predetermined threshold level for a specific period of time, the electricity supply to the motor is cut off or reduced to below a suitable safe level (for example, the aforesaid threshold level).

Control device 32 delivers the feed current to electric motor 12 and, as mentioned, comprises suitable feed switches, typically inverters, used to control such a motor, and positioned between detection device 24 and a high voltage circuit 34; this high voltage circuit 34 feeds electric motor 12 drawing electrical power from the grid.

In addition to this, provision is made for a low voltage circuit 36, comprising a voltage reducing transformer, a bridge rectifier, a filter, and a voltage regulator to supply low voltage levels to interface circuit 30 and microprocessor circuit 28.

In a preferred embodiment of the present invention provision is also made for the presence of a memory unit 37 connected to microprocessor 28 and containing information relating to the torque/speed graphs in relation to feed frequency, amplitude and voltage (and therefore the feed current) and the particular model of electric motor 12 installed on the tyre fitting machine.

For a given feed voltage the torque/speed curves differ depending upon the frequency (or amplitude) applied, and easily make it possible to identify which are the optimum torque/speed combinations for the electric motor at a particular frequency (or amplitude), and for particular operating conditions. Because these graphs are known for each electric motor, if the motor should diverge from optimum operating conditions, a situation detected by detection device 24, monitoring device 26 will suitably alter the frequency (or amplitude) of the motor feed current and/or voltage to return electric motor 12 to optimum operating conditions, in terms of the torque/speed ratio, according to the new fitting/removal operating conditions. In other words, on the basis of at least one of the operating parameters detected by abovementioned device 24, monitoring device 26 acts on the feed to electric motor 12 to return it and/or keep it in an optimum operating condition in relation to the torque which has to be provided.

Tyre fitting machine 10 may also comprise means 47 for detecting the rotation speed of motor shaft 14. These means, for example, comprise at least one electronic, electromechanical or mechanical rotation sensor, are connected to monitoring device 26 and may be mounted in different positions. As an alternative, such detector means 47 may be an independent detection device such as an encoder associated with shaft 14 or a transmission member of the drive means. For example, means 47 may also be a magnetic sensor or other component capable of detecting the rotation of a tooth in a gear wheel of the transmission components of the drive means.

Means 47 may thus detect any or a particular combination of any of the rotation speeds of shaft 14, the tyre, the rim or the tyre/rim assembly.

In this text, because the rotation speed of the motor shaft (obviously) always depends on the motor feed conditions (current and/or voltage), the data relating to this speed will also be considered in the remainder of the patent text as being a "motor operating parameter" (even if indirectly, and depending on the direct motor operating parameters associated with its electrical feed).

The signals or data originating from such sensor (or other detector means) are passed to microprocessor 28 of monitoring unit 26 and are used as a possible alternative or to supplement and enrich the information which can be obtained from the signals originating from detection device 24 correlated with the strength of the current taken up by electric motor 12, to increase the accuracy of determination of the actual fitting/removal operating conditions.

In a similar way, tyre fitting machine 10 may also comprise means for detecting the resistance torque applied to the motor (not shown in the figure). These means, for example, comprise at least one torque measuring device, or torque meter, accelerometer, load cell or the like; said means may for example be associated with the tyre fitting machine on motor shaft 14 or rotating support 16 and are also connected to monitoring device 26 and therefore to microprocessor 28 to send signals or data representative of the resistance torque to said device. These signals may also be used to supplement and enrich the information which can be obtained from the signals originating from detection device about the current consumption and/or rotation speed of electric motor 12 (that is corresponding to the motor operating parameters).

Even if what follows is not part of the present invention, tyre fitting machine 10 may also include, in a manner which is in itself known, means for detecting the mechanical forces transmitted to the bead of tyre during the fitting/removal operations by tool 18 which moves said bead. Said means for detecting mechanical forces comprise at least one sensor 50, for example an extensometer, which may be mounted on the tyre fitting machine in various positions. For example, sensor 50 may be associated with a portion of supporting arm 20, as illustrated in FIG. 1. However, sensor 50 may be associated with the tyre fitting machine in other different positions.

Tyre fitting machine 10 may also comprise a plurality of sensors 50 or detection means which are in themselves known and are capable of detecting the mechanical forces transmitted to the bead of a tyre, located at different positions and possibly of a different type from each other. The signals or data originating from the at least one sensor 50 are passed to microprocessor 28 and may also be used to supplement and enrich the information which can be obtained through the signals originating from detection device 24 correlated to the strength of the current consumption and/or rotation speed of electric motor 12 in order to increase the accuracy of determination of the actual operating conditions for fitting/removal.

The invention also provides that during at least one stage or part of the operation of tyre fitting machine 10, at least one actual operating parameter of motor 12 of such machine 10 and/or its gradient over time (or several operating parameters and/or their gradients) are continually monitored by device 26 and in particular microprocessor 28 to obtain information on conduct of the tyre fitting and/or removal operation. In particular, through such monitoring, it is possible to know whether the operating range of machine 10 is or is not acceptable or whether such machine is performing said fitting or removal in a manner such as not to cause any damage to the bead of the tyre.

The monitored operating parameters of motor 12 (in automatic mode by said device 26) are at least one of the operating parameters (actual parameters and/or their gradients) for electric motor 12, and its motor shaft 14. In the case of the electric motor, the monitored operating parameter is selected from at least one of the rotation speed of motor 12 or the current consumption, frequency, amplitude and voltage of the feed current to said motor or the resistance torque applied to it.

In the case of motor shaft 14, it is its rotation speed which corresponds to the rotation speed of the unit or tyre/rim assembly or the rim alone.

These operating parameters are detected in real time by monitoring device 26 and therefore by microprocessor 28. The latter, as mentioned, is connected to memory unit 37 where many predetermined minimum and maximum threshold values for each actual operating parameter or at least one gradient thereof, and that is their rate of change over time, are stored in memory. A plurality of actual operating parameters and/or their gradients may be used by device 26 to monitor tyre fitting machine 10.

Figure 4:
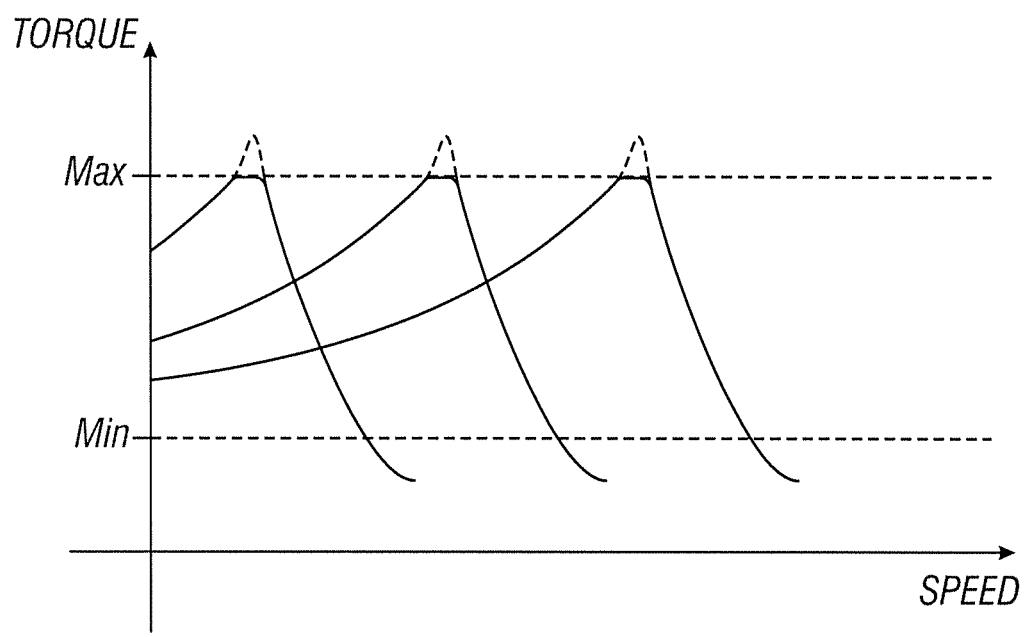
FIG. 4 shows a typical graph representing the relationship between frequency, speed and torque for an asynchronous electric motor.

Preferably the minimum and maximum values may be constant over time or vary over time while keeping the distance between said values constant. In other words, with reference to FIG. 4, the MAX and MIN values (in the case in the figure relating to the motor torque) may define a band parallel to the speed axis; as an alternative, such values may define a wavy band in the speed/torque plane, while maintaining the amplitude of the band unchanged.

Obviously the amplitude of the band may also vary over time.

Such minimum and maximum values define an "operating range" for the machine which is accepted as an operating range that does not damage the tyre during fitting and removal onto and from a rim.

Device 26 or microprocessor 28 continuously monitor the actual operating parameter or parameters (or "every parameter") selected and/or their gradients with corresponding threshold values to check whether said parameter and/or gradient or said parameters and/or gradients remain within the range defined by said maximum and minimum threshold values. Obviously, device 26 may operate on several operating parameters and/or their gradients at the same time.

When it is determined that an operating parameter of motor 12 adopts an actual value or gradient greater than or less than the corresponding preset threshold value, microprocessor 28 acts automatically on the feed to electric motor 12 and supplies it in such a way that the monitored operating parameter decreases (if above the upper threshold) or increases (if below the lower threshold) to return it within a range or strip or "band" of values and/or gradients corresponding to optimum and acceptable operation (as indicated above) of tyre fitting machine 10.

If the operating parameter should exceed the upper threshold value (MAX value in FIG. 4) or fall below the minimum value (MIN value in FIG. 4), device 26 or microprocessor 28 will automatically slow motor 12, stopping it if necessary, to prevent the occurrence of mechanical problems in the components of tyre fitting machine 10, or in the tyre or the rim.

Advantageously, provision is made for a visual and/or acoustic warning device, which is activated whenever the actual value or gradient or change in the monitored operating parameter exceeds the corresponding value of the maximum or higher preset threshold or descends below the lower or minimum threshold value.

It is also possible to define at least one or preferably two or more reference points (mechanical or electrically correlated points) of the starting position for the period of operation of the motor. These points may be defined in different ways, for example, by a valve mounted on the rim, by a notch or other reference point present on the tyre or on the rim, through detecting a reference point on shaft 14 or on a rotating member associated therewith (for example, a tooth of a gear or transmission member associated with shaft 14) or the motor or the support for the tyre/rim unit. The detector for this reference point value may be any suitable component such as an optical, ultrasound, mechanical or electromechanical sensor, or the like.

The existence of a reference point may serve to improve the accuracy of the machine. There may be two or more "zero points" for each type of parameter monitored, which may be of a different type (for example, relating to current consumption, feed voltage, position of the gear of the transmission components, etc.) or of a similar type (for example, to detect rotation of the gear or wheel, for example, by means of the gas filling valve of the tyre). This improves accuracy in control of the machine.

In addition to this, the use of a predetermined upper and predetermined lower threshold value has been described. However, several successive threshold values, towards the upper value or towards the lower value, distributed over a portion of at least one operating phase of fitting and/or removal of a tyre by tyre fitting machine 10, may be provided for.

Thanks to the manner in which the invention is implemented, device 26 is capable of recognising what type of operation is being performed on the tyre (fitting or removal) and this makes it possible to optimise the functioning of the motor, for example by drawing suitable different speed/torque graphs for a particular motor 12 from memory 37, or stages of permitted values such as to make it possible to approach the predetermined threshold values to have particularly smooth operation of the motor itself.

It is also possible to provide that microprocessor 28 "self-learns" a suitable functioning of the machine (or functioning with suitable values for the motor and/or shaft 14) in relation to the different tyres whose characteristics are placed in memory unit 37 and which are recalled by an operator when he prepares to fit or remove a particular tyre onto and from a rim. The microprocessor detects the operating parameters of the motor during such fitting or removal operation, and after it has been confirmed by the operator that the operation is being performed correctly, memorises them in memory unit 37, associating them with a particular tyre. When the operator has to work on a similar tyre, the microprocessor will control the fitting or removal operation in a wholly automatic way on the basis of the parameters in memory.

Preferably, the method according to the present invention provides that at the start of fitting/removal operations tyre fitting machine 10 will be started in a first configuration in which the rotation speed of the wheel (rim/tyre unit) or the rim alone, once fixed to rotating support 16, is first set to be equal to a predetermined working speed. For example, the initial speed of electric motor 12 may correspond to the rated speed of the motor at 100 Hz, which corresponds to approximately 3,000 rpm for a standard four-pole motor. The motor speed may then be reduced by means of a gearbox to approximately 14 rpm for motor shaft 14. This initial configuration is, for example, obtained by acting on a suitable and known speed selector device associated with tyre fitting machine 10. This device, for example, a pedal (not shown in the figure) can be operated by the operator. Preferably, the initial configuration just described is obtained by positioning the pedal in a first working position, for example, in an intermediate position with respect to a stopped position of motor 12 and a position for maximum rotation of the latter.

When the operator decides to change over to automatic mode he moves the pedal to a second operating position, for example in the fully down position of the path along which the pedal can move. In this configuration, the rotation speed of the motor, and consequently that of the wheel, is determined wholly automatically, to optimise the torque and speed characteristics of the motor on the basis of the fitting/removal operating conditions, as described previously. In general, the effective speed of the motor may automatically decrease, depending upon conditions, until it corresponds to the rated speed of the motor at 50 Hz, approximately 1500 rpm for a standard four-pole motor. Thanks to the presence of the gearbox, this is reflected in motor shaft 14 as approximately 7 rpm.

In a more productive version the tyre fitting machine may instead be caused to operate over a more extensive range of speeds, for example, the electric motor may rotate at speeds between 900 rpm (rated speed at 20 Hz) and 4500 rpm (rated speed at 150 Hz). Thanks to the presence of the gearbox, the speed range of the wheel and/or the rim mounted on rotating support 16 will vary between 2.8 rpm and 21 rpm.

In other words, if a standard four-pole induction motor is used, the effective speed of the motor may be caused to vary between a minimum, around that of its rated speed at 20 Hz, or at approximately 900 rpm, and a maximum, approximately corresponding to the rated speed of the motor at 150 Hz, that is corresponding to approximately 4500 rpm.

Because the above-mentioned gearbox is normally used, this means that the speed of the main shaft will be caused to vary between approximately 2.8 rpm and approximately 21 rpm. More frequently the frequency range will be caused to vary between 50 Hz and 100 Hz, corresponding to a motor speed range of between approximately 1500 rpm and approximately 3000 rpm, which are usually geared down at the main shaft to a range varying from approximately 7 rpm to approximately 14 rpm.

The initial working speed may be set to be equal to any speed which can be achieved by the electric motor/gearbox system to guarantee satisfactory ergonomic and practical requirements and to safeguard operator safety.

In addition to this, the tyre fitting machine may be configured so as to operate in different ways, corresponding to different definitions of optimum torque/speed combinations, for example corresponding to motor operating conditions intended to maximise speed or power, or to minimise energy consumption or noise emissions. This choice of manner of automatic functioning may be made by the operator through any control device, for example a suitable push-button (not shown in the figures) attached to or incorporated in the equipment for fitting/removing tyres. The control device may also be physically detached from the tyre fitting machine, and capable of communicating therewith by means of a connection made by cable or of the wireless type.

As an alternative, the manner of automatic functioning may be chosen by the operator by acting directly on the previously mentioned speed selector pedal. In the latter case, this pedal has the possibility of being located in a plurality of different working positions corresponding to the different automatic operating configurations implemented on the machine.

It should be noted that the method described and the equipment implementing it can also be installed on tyre fitting machines which are already in operation and which were originally not provided with such equipment.

The invention described above makes possible "centralised" control of the tyre fitting machine through control of at least one of the operating parameters of motor 12, without having to consider other implementing components such as those associated with the usual tools or devices which act together directly with the wheel to separate off the tyre from the rim, or to fit such tyre to the latter.

Various embodiments of the invention have been described and mentioned. Others can however be obtained on the basis of the above description and are to be regarded as falling within the scope of the following claims.

The invention claimed is:

1. A method for fitting a tyre onto a rim or removing a tyre from a rim in a tyre fitting machine, in which a wheel or a tyre/rim assembly or the rim alone is caused to rotate about an axis of rotation of an electric motor and a motion transmission unit, provided with a tool acting together with the tyre to perform said fitting and/or removal, said method comprising the steps of:

continuously monitoring at least one operating parameter of the electric motor of said tyre fitting machine during rotation of said assembly or said rim alone;

determining an actual value of each of at least one operating parameter, said actual value representing an instantaneous operating conditions of said tyre fitting machine;

automatically monitoring a change in or gradient of said actual value over time while said tyre fitting machine is in operation; and checking said actual value or the change in said actual value over time with at least one corresponding predetermined threshold value, wherein at least one corresponding predetermined threshold value defines a range of actual values or a range of variation in said actual values delimiting an accepted operating range of said tyre fitting machine, wherein a range of the at least one corresponding predetermined threshold value includes a maximum threshold value and a minimum threshold value for delimiting the range of actual values or the range of variation, and wherein the electric motor is controlled to maintain said determined actual value or the changes in said actual value over time within said range of the at least one corresponding predetermined threshold value.

2. The method according to claim 1, in which the monitored operating value is at least one of current consumption of the electric motor, a frequency or amplitude of current or feed voltage to the electric motor.

3. The method according to claim 1, in which the monitored operating parameter is resistance torque applied to the electric motor.

4. The method according to claim 1, in which the monitored operating parameter is one of a rotation speed of the electric motor and a rotation speed of the motion transmission unit associated with said electric motor.

5. The method according to claim 1, wherein provision is made for a plurality of successive threshold values increasing towards a preset upper threshold value or decreasing towards a lower threshold value with which the operating parameter is continuously compared, and wherein said plurality of successive threshold values is distributed over at least a portion of at least one operating stage of the tyre fitting machine.

6. The method according to claim 1, wherein the minimum and maximum threshold values are alternatively constant over time or vary during the fitting/removal operation, and wherein a distance between the maximum threshold value and the minimum threshold value remains constant over time during the fitting/removal operation.

7. The method according to claim 1, wherein provision is made for determining at least one reference point used to determine a starting position of an operating period of the electric motor.

8. The method according to claim 7, wherein said at least one reference point includes two reference points, and wherein said two reference points are mechanically and/or electromechanically correlated.

9. The method according to claim 1, wherein provision is made for an emission of a visual and/or acoustic warning whenever the actual value or the change in the actual value over time exceeds corresponding maximum threshold value or descends below the minimum threshold value.

10. The method according to claim 1, wherein whether a type of operation performed by the tyre fitting machine is fitting or removing a tyre onto or from a rim is determined based on monitoring the detected actual value or the change of the actual value over time being within the range defined by said maximum and minimum threshold values.

11. The method according to claim 1, wherein monitoring and maintaining said actual values and every change in the actual values are performed by slowing or stopping the tyre fitting machine.

12. A tyre fitting machine for fitting a tyre onto a rim or removing the tyre from a rim, the tyre fitting machine comprising:
- a support for a tyre/rim assembly or the rim alone, said support rotating about an axis driven by an electric motor driving a transmission unit causing said support to rotate;
- a tool acting together with and moving a bead of the tyre, said tool being mounted on said support carried by part of the tyre fitting machine;
- an actuator controlled and monitored by a monitoring device comprising:
  - a microprocessor unit acting together with a memory unit containing preset threshold values of at least one operating parameter of the electric motor of said tyre fitting machine; and
  - at least one change over time in the at least one operating parameter of the electric motor with reference to at least one operating stage of the tyre fitting machine, provision being made for a detector that detects actual values of the at least one operating parameter or change in the actual values over time continuously during rotation of said assembly or the rim alone,
- wherein the detector is connected to said monitoring device to which the actual values of the at least one operating parameter or the change in the actual values over time, which are continuously monitored is sent,
- wherein said monitoring device continuously compares the actual values or the changes in the actual values over time detected by said detector with at least one corresponding upper threshold value or with at least one corresponding lower threshold value to detect whether the actual values or changes over time exceed said upper threshold value or descend below said lower threshold value and whether the actual values found depart from a band of values corresponding to an accepted operating range of said tyre fitting machine, the monitoring device acting to return the actual values within the band if the actual values fall outside said band of values.

13. The machine according to claim 12, wherein said detector detects a characteristic associated with an electrical feed to the electric motor as at least one of a current consumption of the electric motor, a frequency, amplitude or voltage of the feed current to the electric motor, said characteristic defining the monitored operating parameter.

14. The machine according to claim 12, wherein said monitored operating parameter is resistance torque applied to the electric motor.

15. The machine according to claim 12, wherein said monitored operating parameter is at least one of the rotation speed of the electric motor and the rotation speed of the transmission unit associated with the electric motor.

16. The machine according to claim 12, wherein the detector comprises at least one of a detector of the rotation speed of the transmission unit, and a detection device for at least one electrical characteristic of the motor.

17. The machine according to claim 12, wherein provision is made for a presence of at least one reference point on one component of the tyre/rim assembly to identify at least one starting point for an operating period of the electric motor during which of the machine for fitting or removing the tyre is operated.

18. The machine according to claim 17, wherein the at least one reference point is selected from at least one of valves on the rim, a notch on the rim, or a reference point on the tyre.

19. The machine according to claim 12, wherein provision is made for the presence of at least one reference point which is alternatively mechanical, electrical or electromechanical on electric motor or on components of the machine associated with the electric motor and driven by the components, said at least one reference point identifying a starting point of the operating period of the electric motor during which the machine for fitting or removing the tyre is operated.

20. The machine according to claim 17, further comprising a detector for detecting said at least one reference point, said detector being alternatively mechanical, electrical, electromechanical, optical and ultrasound.

21. The machine according to claim 12, wherein said monitoring device monitors and automatically controls the electric motor through controlling a transmission ratio of transmission components functionally connected to said electric motor and said transmission unit.

* * * * *